Figure 13:
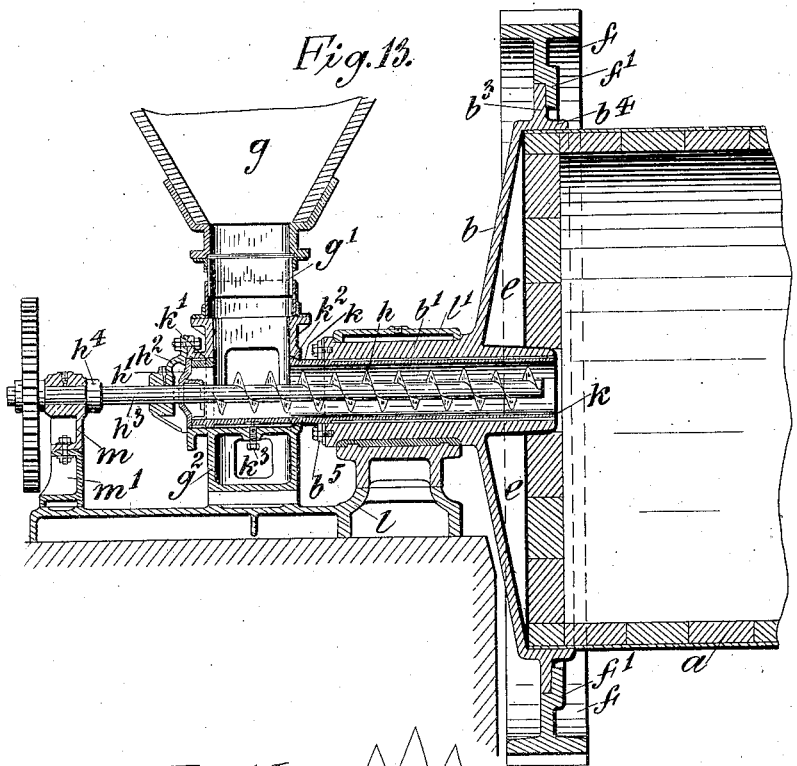

P. T. LINDHARD.
BALL MILL.
APPLICATION FILED JAN. 31, 1906.
937,826.
Patented Oct. 26, 1909.
4 SHEETS—SHEET 1.
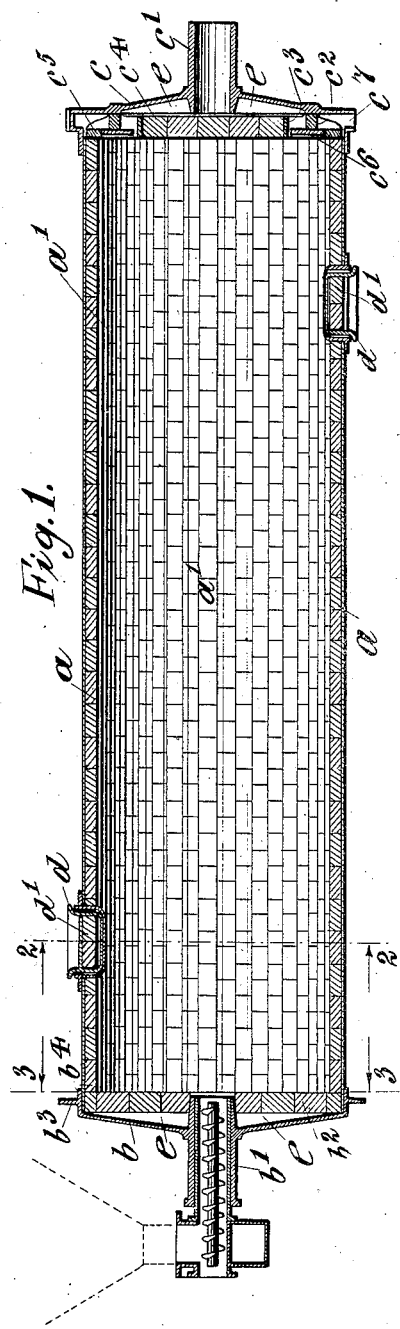
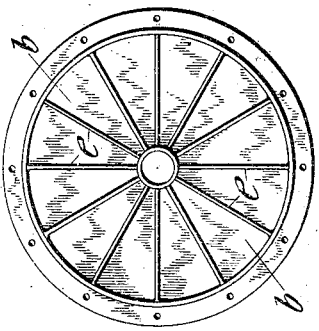
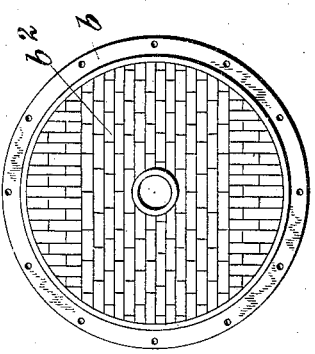
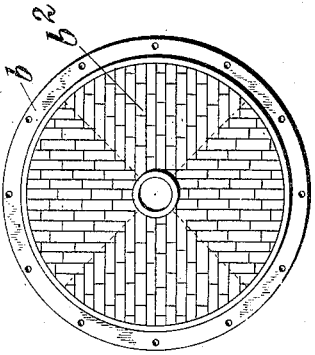
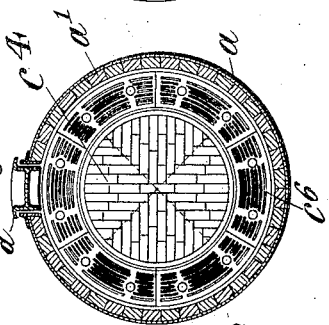

P. T. LINDHARD.
BALL MILL.
APPLICATION FILED JAN. 31, 1906.
937,826.
Patented Oct. 26, 1909.
4 SHEETS—SHEET 2.
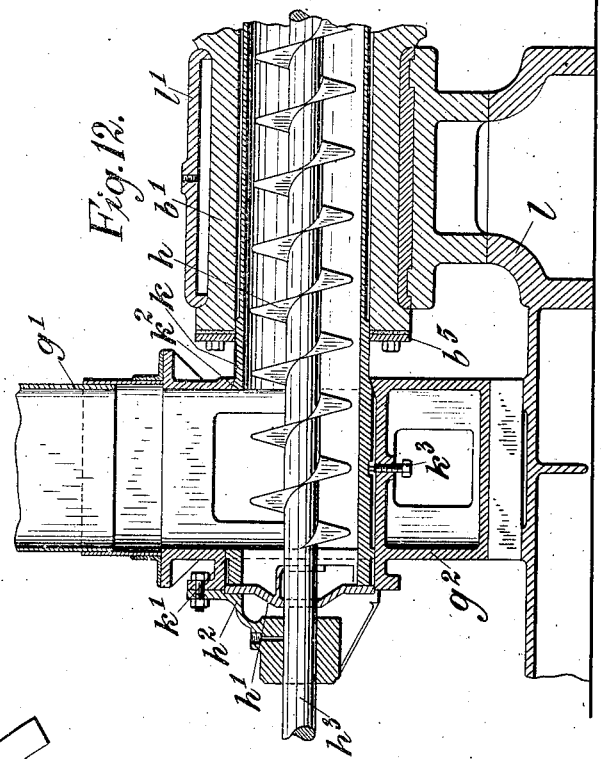
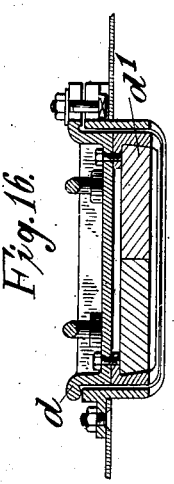
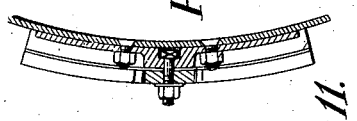
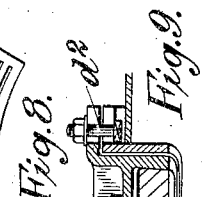
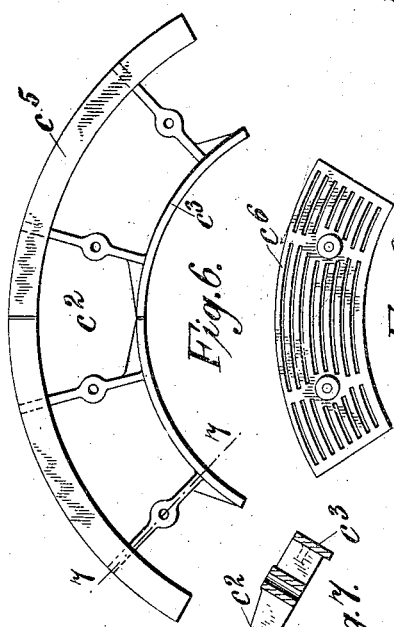
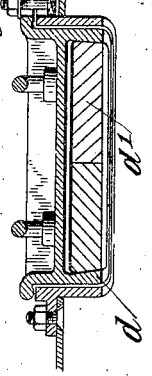
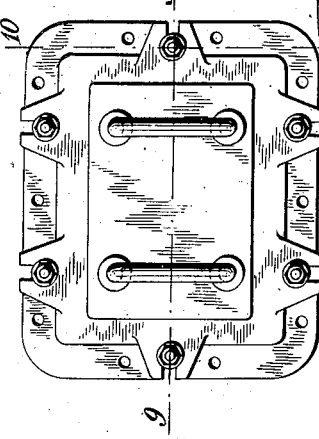

P. T. LINDHARD.
BALL MILL.
APPLICATION FILED JAN. 31, 1906.

937,826.

Patented Oct. 26, 1909.
4 SHEETS—SHEET 3.

Witnesses
Inventor
Poul T. Lindhard
By his Attorneys

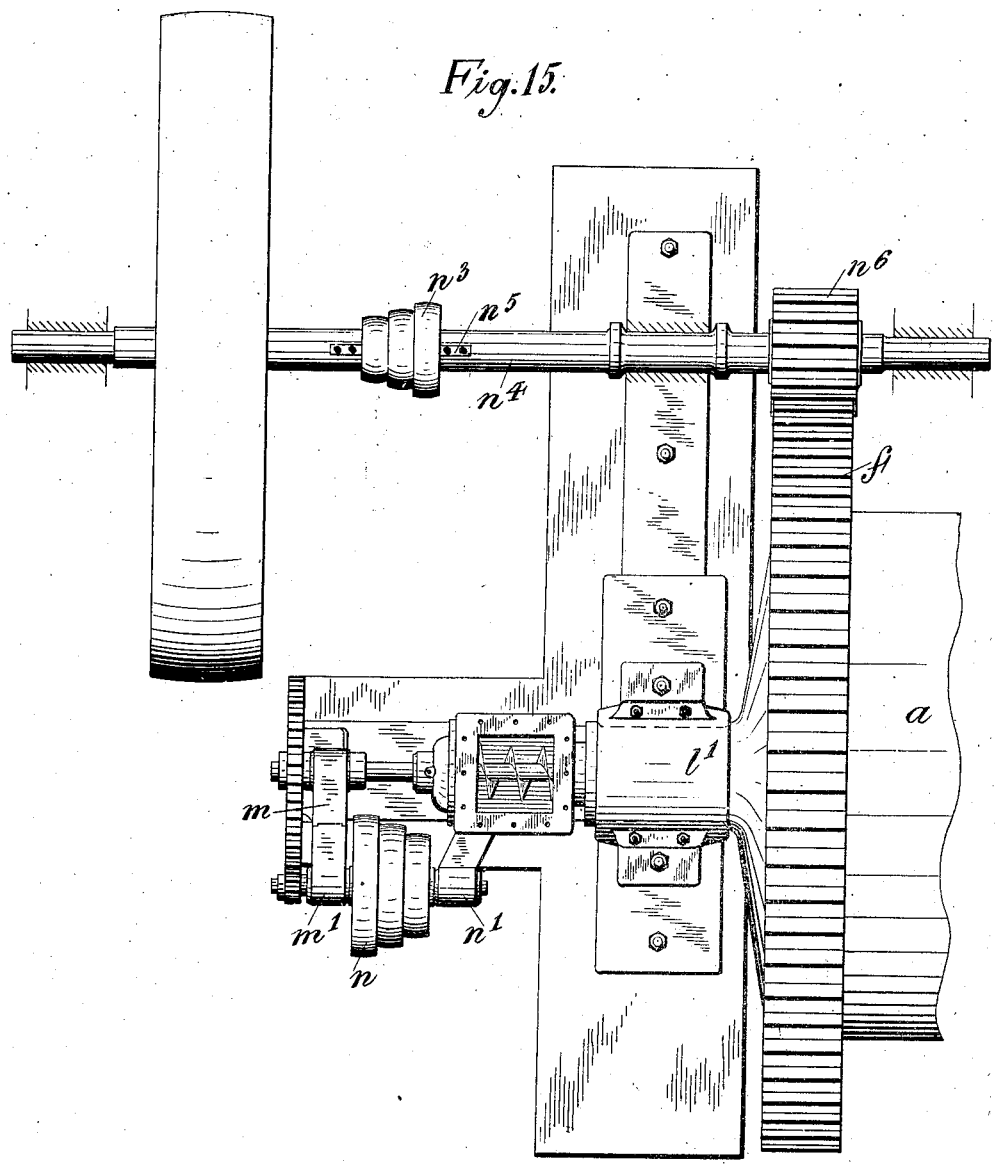

UNITED STATES PATENT OFFICE.

POVL T. LINDHARD, OF NEW YORK, N. Y.

BALL-MILL.

937,826.

Specification of Letters Patent.    Patented Oct. 26, 1909.

Application filed January 31, 1906. Serial No. 298,750.

*To all whom it may concern:*

Be it known that I, POVL T. LINDHARD, a subject of the King of Denmark, and a resident of the borough of Manhattan, of the city of New York, in the county and State of New York, have invented certain new and useful Improvements in Ball-Mills, of which the following is a specification, reference being had to the accompanying drawings, forming a part thereof.

In apparatuses, such as tubular ball mills, which are employed to grind up hard materials such as the ingredients of cement and the like, and in which flint pebbles are generally employed for the grinding, it is desirable to provide a very hard lining which cannot easily be worn away by the flint pebbles or other ball grinding means and by the hard material being ground. Steel linings are impracticable in such mills for the reason that they require too frequent replacing and for the further reason that it is objectionable in many instances to have so large a proportion of iron in the yield from a mill which the wearing away of the steel lining produces. Linings of silex or other hard stone have been employed for the curved sides of tubular mills, but the difficulty of cutting and mounting the stone has rendered such a lining impracticable for the ends of continuous ball grinding mills.

One object of this invention is accordingly to overcome the difficulties which have existed heretofore in providing continuous ball grinding mills with stone linings at their ends.

Furthermore, as will be understood, the ends or heads of the grinding drum in tubular ball mills are generally formed with trunnions upon which the drum is supported, and a further object of this invention is to improve the construction of these ends or heads with a view toward placing the material therein in the lines in which the supporting stresses act whereby the ends or heads are rendered much stronger. These ends or heads are also preferably constructed with a view toward convenience in attaching and detaching the master wheel or parts thereof, the master wheel being generally secured to one of the ends or heads.

Still another object of the invention is to arrange the metallic wearing parts of ball grinding mills so that they may be easily and readily exchanged without cutting into the stone lining and without removing the pebbles from the machine, whereby these parts may be removed and replaced, if need be, without substantially interfering with the operation of the machine.

Still another object of the invention is the provision of a feed pipe and a feed screw for a tubular mill, which pipe and screw shall be so related to the mill as to be quickly and conveniently removable and which shall be so related to the hopper or its associated parts as to be removable independently thereof.

Figure 14:
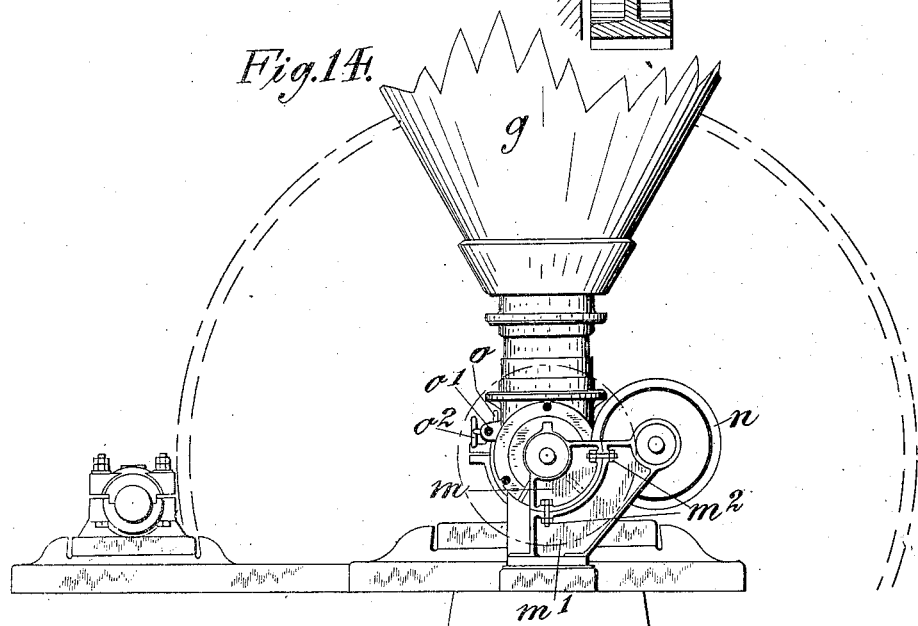

In the accompanying drawings, which illustrate a tubular ball mill with the invention embodied therein, Figure 1 is a view of the drum in central vertical section, with the hopper indicated in elevation. Figs. 2 and 3 are sectional views of the same taken on the planes indicated by the lines 2—2 and 3—3 in Fig. 1 respectively. Fig. 4 is a view similar to Fig. 3 but showing a different disposition of the stone lining blocks. Fig. 5 is a view similar to Figs. 3 and 4 with the stone lining blocks removed. Fig. 6 is a plan view, on an enlarged scale, of two sections of a ring which supports the lining and the grating at the discharge end of the drum, and having a flange or butt-ring against which the stone lining of the shell rests. Fig. 7 is a sectional view of the same, the plane of this section being indicated by the line 7—7 in Fig. 6. Fig. 8 is a plan view of a section of the grating on an enlarged scale. Figs. 9 and 10 are sectional views showing the construction of a man hole cover for the drum, the planes of these sections being indicated by the lines 9—9 and 10—10 in Fig. 11. Fig. 11 is a plan view, on an enlarged scale, of the man hole cover which is shown in this figure attached upon the drum. Fig. 12 is a view in central vertical section, on an enlarged scale, through a portion of the feed pipe and adjacent parts, and showing a portion of the feed screw in elevation. Fig. 13 is a similar view, on a slightly smaller scale, and showing the end of the drum. Fig. 14 is a view of the mill in end elevation, Fig. 15 is a plan view of the same end, and, Fig. 16 is a detail sectional view showing a portion of the man hole cover.

Referring first to the drum of the improved mill and to Figs. 1 to 5 inclusive, in which the drum is illustrated in detail, the outer frame or shell thereof, is designated by the letter $a$ and the castings constituting the ends or heads of the drum and which form part of the outer frame or shell $a$, by letters $b$ and $c$ respectively. The curved sides of the frame or shell are preferably lined with stone blocks of flint, silex, or some other hard material, as usual which are shown at $a'$. This lining $a'$ may be formed by laying the blocks around the curved sides of the drum and cementing them together, thus forming an integral whole. The head $b$ at the forward end of the drum, that is the end through which the material to be ground is fed, is preferably cast with a trunnion bearing $b'$ upon which this end of the drum is supported, and the bearing is preferably extended inwardly to form a support for a lining $b^2$ at this end of the drum. Said lining also consists of stone, preferably of stone blocks like the lining $a'$, and is supported between the inwardly extending portion of the bearing $b'$ and the curved sides of the drum. In laying the blocks to form the lining $b^2$, it is desirable that as much cutting of the blocks be avoided as is possible on account of the great difficulty which the cutting of flint blocks entails. Such cutting may be reduced to a minimum by laying the blocks so that it will be unnecessary to cut them with angles of less than 45 degrees between the sides of the blocks and the ends which are cut.

In Figs. 3 and 4, two methods of laying the blocks in the forward end or head of the drum are illustrated. It will be obvious that in accordance with either of the arrangements of blocks shown in these figures, it will not be necessary to cut off the ends of the blocks at angles less than 45 degrees in order to make them fit the circular space the ends or heads. In both Figs. 3 and 4, the blocks lie lengthwise in two directions at right angles to each other, and there may be said to be four sets of blocks each of which meets the circumference of the head so as to border upon said circumference for about ninety degrees. Of these arrangements, that shown in Fig. 3, in which the blocks are arranged in four sets (each set occupying a quadrant) and extend in two directions at right angles to each other from the center, is the preferable one.

The lining of the discharge head $c$ of the drum is also preferably formed of stone blocks and the arrangement of the blocks is preferably similar to that shown in Fig. 3. This discharge head is illustrated in Fig. 2 and parts thereof are shown in Figs. 6, 7 and 8. To the casting $c$, which forms the main portion of the head and which is also formed with a trunnion bearing $c'$ to support this end of the drum, is secured a ring $c^2$ which may be formed in sections, as shown in Fig. 6. This ring is secured near the periphery of the head $c$ and on the inside thereof, and is formed with a circular flange $c^3$ for supporting the end lining $c^4$, and a second flange or butt-ring $c^5$ for holding the lining $a'$ of the shell in place. To the ring $c^2$ is attached a grating $c^6$, one section of which is shown in Fig. 6, and the grating and the ring together form an annular space in the discharge head of the drum through which the ground material which has passed the grating leaves the drum, openings $c^7$ being provided at intervals in the periphery of this head in order to permit the discharge of such material. The sections of the grating $c^6$ and the ring $c^2$ are preferably staggered so that any section of the grating can be removed without releasing any of the sections of the ring which will be held in place by the two bolts on either side of the section of grating removed, while that section is being exchanged.

The drum is provided with one or more man holes which are closed ordinarily by suitable man hole covers. These covers may comprise a metallic frame portion $d$ provided with a stone lining $d'$ and the means for securing the covers upon the drum may comprise bolts $d^2$ which, on being loosened, are conveniently slidable from their seats so as to be readily removed therefrom to permit the raising of the cover without necessitating the complete removal of the nuts, (Figs. 9, 10 and 11). As shown in Fig. 16, the portion of the frame of the man hole cover which supports the stone lining, may be made detachable, thus making it unnecessary to exchange the entire cover when this portion of the frame is worn out. It is ...able to provide two such man holes ... ) degrees apart around the curved surface of the drum so that access may be had to the interior of the drum, while the balls remain therein, in any position. It will be seen that very little surface, except the lining of the drum, is exposed to the action of the grinding balls or of the material being ground, the only metallic surfaces which are thus exposed, as a matter of fact, being the edges of the frames of the man hole covers and the grating $c^6$. The grating $c^6$ being formed in sections, which may be attached to the ring $c^2$ by the same fastenings that are employed to attach this ring to the head $c$, each section of this grating may be removed independently of the other sections, and different blocks or portions of the lining of the drum may be removed separately, as will be obvious. It will thus be seen that any portion of the interior of the drum may be removed and replaced without taking the balls out of the drum and, therefore, with very little interruption in the use of the mill.

The heads, $b$ and $c$ of the drum are formed, as usual, with ribs $e$, but these ribs, instead of being on the outer side of the head are on the inner side and the linings of the heads abut against these ribs. By making the outer side of the heads of the drum substantially conical and having the ribs extend inwardly therefrom, the material of the heads is disposed more in line with the stresses due to the weight of the drum which, as before described, is supported upon trunnions formed integral with the heads, than by placing the ribs upon the outside of the heads. Furthermore, by placing the ribs upon the inside of the heads, they are protected from the destructive effect of the lubricating oil which drops from the trunnions and which, if it gets into a crack or other imperfection in the head castings, eats its way into these castings and weakens them materially.

Referring to Fig. 13, it will be seen that the forward head of the drum $b$ is formed with a flange $b^3$ to which the master wheel $f$ is secured. This flange $b^3$ is preferably formed integral with the periphery $b^4$ of the head which periphery consists of a relatively broad circular band and is riveted or otherwise secured to the drum. Heretofore in order to secure the head to the drum, a flange corresponding to the flange $b^3$ upon the head of the drum was bolted to a bracket secured upon the periphery of the drum, and the master wheel was secured thereto by the same bolts. In removing the master wheel or a part thereof from the drum, it was necessary in the old construction to remove these bolts which, of course, not only secured the master wheel to the drum but which also held the head in place. This rendered it necessary, as will be obvious, to support the end of the drum in some manner before the bolts could be removed. As it is frequently necessary to remove portions of the master wheel $f$ on account of the wearing away of the wheel teeth, it is very advantageous to have this wheel secured to the drum independently of the means for securing the head to the drum, as in the present case. As shown in Fig. 13, the master wheel is provided with a flange $f'$ slightly off center and when the teeth on one side of the wheel become worn the wheel may be removed from the drum and its position thereon reversed by fastening the flange $f'$ upon the opposite side of the flange $b^3$.

As will be readily understood, the material to be ground is introduced into the hopper $g$ and fed therefrom by means of a screw $h$ into the drum through a feed pipe $k$. These feed pipes are exposed to a great deal of wear and tear and have to be replaced from time to time, and for this purpose it is very advantageous to be able to remove the feed pipe quickly and conveniently. Heretofore it has been impossible to remove the feed pipe without removing the entire feeding device. The same is also true of the feed screw, and the present feeding device is so constructed as to enable one man to remove the feed pipe and the feed screw from the machine and to replace these parts if need be, quickly and conveniently. As shown in Fig. 13, the forward end of the drum is supported in a main bearing $l$ provided with a cap $l'$, suitable shoulders being formed at either end of the trunnion $b'$ to prevent the drum from moving longitudinally. Just in advance of the main bearing $l$ is the hopper $g$ and its adjacent parts. This hopper $g$ which often contains several tons of material at a time, is preferably supported independently of the machine and is connected thereto by a telescoping chute $g'$, the lower portion of which rests upon a support $g^2$. The feed pipe $k$ extends through the delivery chute and hollow trunnion $b'$ into the drum of the machine. A packing gland $b^5$ for holding suitable packing may be provided on the end of the trunnion $b'$ to prevent any material from leaking between the feed pipe and the trunnion, and the feed pipe may be formed with flanges $k'$ and $k^2$ in order to prevent any leakage from the hopper, the only machining which it is necessary to do upon the feed pipe being in the formation of the flanges $k'$ and $k^2$ and at the point where gland $b^5$ comes. The upper side of the feed pipe where it passes through the hopper is of course provided with an opening to receive material from the hopper, and at the forward end of the feed pipe is a gland $h'$ held in position against the end of the feed pipe by a flange bearing $h^2$ secured in any suitable manner to the delivery chute. The flange $k^2$ being preferably cone-shaped it will be seen that the feed pipe is held in position and against longitudinal movement by this collar and by the bearing $h^2$. It may be held against rotary movement by means of a screw $k^3$ in the support $g^2$.

The screw shaft $h^3$ is supported in the bearing $h^2$ and in a second bearing upon the extreme end of the machine, a collar $h^4$ being provided upon the shaft to take up the thrust of the screw. The gland $h^2$ preferably consists substantially of two rings embracing the shaft $h^3$ in two different planes, thus forming a space which communicates at the bottom with the feed pipe. In this way material is prevented from reaching the bearing $h^2$ and wearing the same away, while such material as passes the first ring drops down through said space and back into the feed pipe.

The second bearing above referred to for the shaft $h^3$ is preferably divided upon the arc of a circle into two parts which have a rib and groove connection, as is shown or are otherwise connected with each other so as to prevent the longitudinal movement of the screw but to permit one of the parts to be slidable upon the other and thus to be separated therefrom so that the screw may be removed from the mill. The upper part $m$ of this bearing may be secured to the lower part $m'$ by means of bolts $m^2$ or any other suitable fastenings. One of the driving pulleys $n$ for the screw may be journaled in the part $m'$ of this bearing and also in a bearing $n'$ upon the support $g^2$. This pulley is preferably a cone pulley and coöperates with a cone pulley $n^3$ slidably secured upon a shaft $n^4$ by means of a feather $n^5$. The shaft $n^4$ may receive power from any suitable source and may be provided with a pinion $n^6$ to drive the master wheel $f$. It is clear that the operator may obtain the speed for the feed screw desired by adjusting the cone pulleys with reference to each other.

When it is desired to remove the feed screw, all that is necessary to be done is to unfasten the bearing $h^2$ and separate the parts $m$ and $m'$ of the second bearing for the feed screw shaft. If it is also desired to remove the feed tube, the screw $h^3$ is turned out from its engagement therewith and, the bearings of the feed screw having been unfastened as just described, the said tube may be drawn out at once.

I claim as my invention:

1. In a ball mill, a drum, a lining of stone blocks or the like therefor, a head secured to said drum, a ring secured to the inner surface of said head and comprising two concentric flange portions spaced apart from each other to thereby form an annular opening for the discharge of finished material, the larger of said flange portions being in engagement with the lining of said drum and the smaller forming a support for a lining of stone blocks or the like, and a lining of stone blocks or the like supported upon the inner surface of said head and retained in place by the smaller of the aforesaid flange portions.

2. In a ball mill, a drum, a head secured to the discharge end of said drum, an inwardly projecting annular flange concentric with and of less diameter than said drum carried by said head, a lining of stone blocks or the like carried by and centrally located upon the inner surface of said head and maintained in place by said flange, and an annular grating extending from said flange to the periphery of said drum.

3. In a tubular ball mill, a head for the discharging end of the drum, said head including a main portion with a trunnion bearing formed therein, a ring secured to the main portion having a flange to support a lining, a lining of stone blocks or the like, and a sectional grating secured to the ring.

4. In a tubular ball mill, the combination of a head for the drum having its outer sides substantially conical and provided with a plurality of inwardly projecting tapered radially extending ribs, their edges forming a flat support for the lining, a lining for the head supported against the inner edges of said ribs, and means independent of said ribs for supporting said lining in place against said ribs.

5. In a tubular ball mill, the combination of a head for the drum having its outer side substantially conical and provided with inwardly extending ribs, a trunnion in said head having an inwardly extending portion, and a lining for said head supported upon said trunnion and against the ribs.

6. In a tubular ball mill, a head for the forward or feed end of the drum, said head including a main portion in which a trunnion bearing is formed and said trunnion bearing extending inwardly toward the interior of the mill to form a support for the lining of the head.

7. In a ball mill, a rotatable drum, a head secured to said drum, a trunnion carried by said head and provided with a passage extending longitudinally thereof, a bearing for said trunnion, a delivery chute having two openings in the walls thereof, a support for said chute independent of said bearing, both the openings in said chute being in alinement with the passage in said trunnion, a feed pipe communicating with said chute and extending through the openings in the walls thereof and through the passage in said trunnion and through which pipe material is supplied to the drum, and means for detachably securing said feed pipe in position.

8. In a ball grinding mill, the combination with the drum and delivery chute, of a feed screw, bearings for the screw, and means to take up the thrust of the screw, one of said bearings being divided upon the arc of a circle into two parts which have a rib and groove connection or the like so as to prevent longitudinal movement of the screw but to permit the one to be slidable upon the other and thus to be separated therefrom so that the screw may be removed from the mill.

9. In a ball grinding mill, the combination with the drum and delivery chute, of a feed pipe extending from the chute into the drum, a feed screw in said pipe the shaft of which extends beyond the chute, a bearing for said shaft secured to a fixed part of the mill and having a flange to hold the feed pipe in position, and a second bearing for the shaft beyond the first bearing, the two bearings being on the outside of the mill so as to be readily detachable to permit the removal of the pipe and the screw.

10. In a ball grinding mill, the combination with the delivery chute, the feed screw shaft, and feed pipe, of a bearing gland at the forward end of the feed pipe, said gland comprising substantially two rings embracing the shaft in two different planes and forming a space communicating with the feed pipe, whereby the material which works through the ring nearest the feed screw can drop back into the feed pipe.

11. In a tubular ball mill, a man hole cover in the outer frame or shell, said cover being provided with a lining of stone or the like, and a removable ring to hold the stone lining in place.

This specification signed and witnessed this 16th day of January, A. D., 1906.

POVL T. LINDHARD.

Signed in the presence of—
THOMAS J. CANTY,
LUCIUS E. VARNEY.